Jan. 21, 1969     NOBUYOSHI SAITO     3,423,125
ATTACHMENT FOR AN AUTOMOBILE TRUNK FOR CARRYING LIVING THINGS
Filed March 1, 1967

INVENTOR.
NOBUYOSHI SAITO
BY *Oldham & Oldham*
ATTORNEYS

United States Patent Office 3,423,125
Patented Jan. 21, 1969

3,423,125
ATTACHMENT FOR AN AUTOMOBILE TRUNK
FOR CARRYING LIVING THINGS
Nobuyoshi Saito, 1975 Haijima-cho, Akishima-shi,
Tokyo, Japan
Filed Mar. 1, 1967, Ser. No. 619,760
Claims priority, application Japan, July 7, 1966,
41/64,174
U.S. Cl. 296—76     1 Claim
Int. Cl. B62d 25/12, 33/04; B60r 11/00

ABSTRACT OF THE DISCLOSURE

This invention relates to an attachment of trunk of a sedan type automobile for carrying living things such as dogs, flowers and the like. By using the attachment, the trunk can be maintained in half-opened condition, for obtaining good ventilation and lighting therein.

Background of the invention

On a journey for hunting, it is very troublesome to consider where a dog is accommodated within the narrow space of a sedan type automobile. Especially on the return way, the dog is usually dirty and muddy and could not be taken inside the automobile. In such a case, it is preferable if the dog can be accommodated within the trunk of the automobile. However, when the trunk is shut, the ventilation and lighting therein are impossible, and the dog will get sick or even die. With an opened trunk, there will be a fear that the dog may jump out from the running automobile, and moreover there is difficulty in driving since the sight through the back mirror is wholly obstacled by the opened cover of the trunk.

If the cover of the trunk is cut to form a round opening(s), for example, for enabling the dog to expose its head from the cover, the above-mentioned difficulties will be removed. However such reconstruction will injure the ability of the trunk in usual use, and the looking of the automobile, and will even lower the price of the automobile when it is desired to be sold.

Summary of the invention

The main object of this invention is to provide an attachment by which the cover of the trunk of a sedan type automobile is kept in half-opened condition without any substantial reconstruction of the automobile body, thereby enabling safe transportation of a dog or the likes.

According to this invention, the attachment is composed of a main frame member for fitting between the rear edge of a trunk and that of its cover, and side frame members for fitting between the side spaces when said main frame member is applied. The frame members are preferably connected one another. The frame members provide sufficient openings for the ventilation and lighting in the trunk, holding the cover in its half-opened condition without obstacling the sight through a back mirror in the room.

The second object of this invention is to provide an attachment of the kind above-mentioned, wherein the side frame members are hinged to the main frame member for enabling folding the side frame members.

By this feature, the attachment becomes compact for facilitating its keep and also its casing to sell.

The third object of this invention to provide an attachment for keeping the cover of an automobile trunk in half-opened condition, wherein the cover can be locked even in such condition. By this feature, the accidental opening of the trunk in running of the automobile and any robbery of the lives accommodated in the trunk, when the automobile is parked, are prevented even if the trunk is half-opened.

The other objects and other merits of this invention will be made clear in the following explanation about preferred embodiments illustrated in the accompanying drawings.

Description of the preferred embodiments

Figure 1:
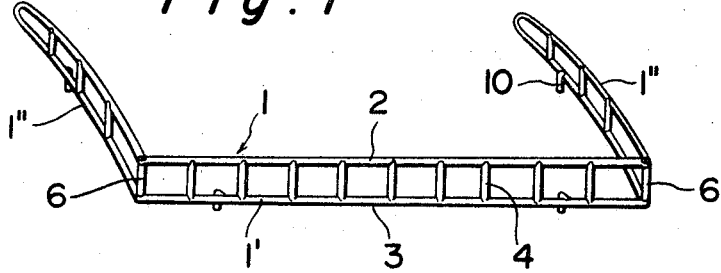
FIGURE 1 is a perspective view of an embodiment of this invention, which is made of metal rods or pipes for constituting the frame members.
Figure 2:
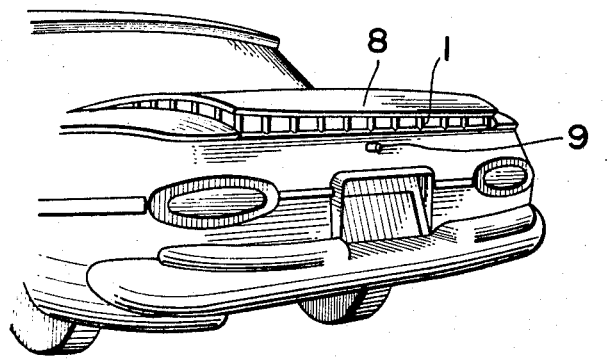
FIGURE 2 is a perspective view of the back of a sedan type automobile for showing the trunk is locked in its half-opened condition with the attachment shown in FIGURE 1.
Figure 3:
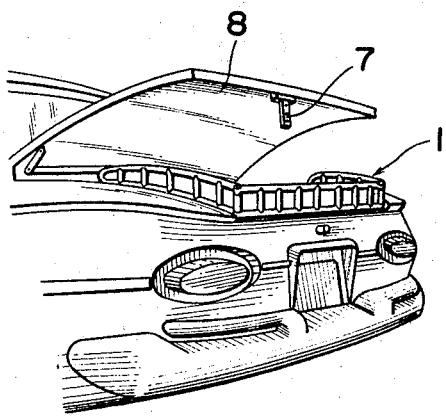
FIGURE 3 is a perspective view similar to FIGURE 2 wherein the cover of the trunk is fully opened.
Figure 4:
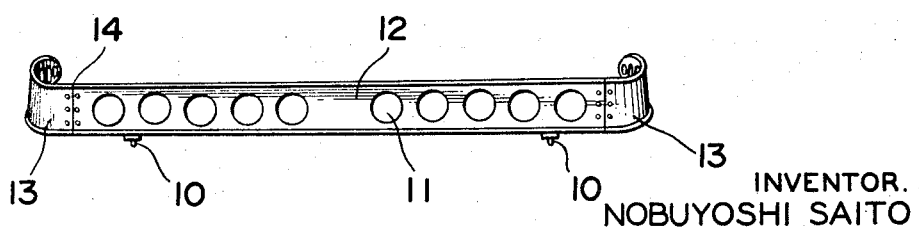
FIGURE 4 shows a modification of this invention, wherein the frame members are made of punched metal.

In FIGURES 1-3, an attachment of this invention is shown by a reference numeral 1, and is composed of a main frame member 1' to be inserted between the rear edge of a trunk and that of its cover 8, and two side frame member 1", 1" to be inserted between the side edges of the trunk and that of the cover 8.

The frame members are made of rods or pipe of metal or high molecular synthetic resin material, and are composed of an upper member 2, a lower member 3 and connecting members 4, which members are integrally fixed with each other by suitable method such as welding. The general configuration of this attachment materially corresponds to the space formed by the edges of the trunk and the cover 8 when the cover 8 is half opened. The height of the attachment 1 or the distance between the upper and lower members 2 and 3 is chosen so that the ventilation and lighting of the interior of the trunk are assured.

In the embodiment shown in FIGURE 1, the side frames can be folded toward the main frame, since the side frames are swingably connected by pivots 6, 6. This contributes to the keeping or casing of the attachment when it is not used and also when it is initially sold.

In use, attachment is placed above the edge of the trunk and hooked thereto by projections 10. Then the cover 8 is brought down up to the limit defined by the attachment as shown in FIGURE 2.

A locking device is illustrated in FIGURE 3, wherein a long rod 7 is used instead of a usual short rod, for engagement with a lock 9 over the height of the attachment 1.

The structure of such locking device may be altered according to the types of automobiles. However it is to be noted that such minor alteration would not injure the body itself, and the recovery of the original state is very easy.

In the modification shown in FIGURE 3, punched metal is used as the frame members. A main frame member 12 and side frame members 13, 13 are made of punched metal having a plurality of holes 11. The frames are connected by hinges at 14. However, general features and merits are entirely same as those of the first embodiment.

Although the invention has been explained with the preferred embodiments, it is to be noted that the invention is not restricted to such embodiments only, but any change and alteration can be effected without departing the scope of the present invention if only the principal idea of the invention is maintained.

What is claimed is:

1. A combination with an automobile trunk having a trunk cover of an attachment for carrying living things in the trunk, which attachment comprises a main frame member detachably mounted at its lower edge onto the rear edge of the trunk in such a manner that its upper edge can abut on the peripheral edge of a trunk cover, a pair of side frame members hinged to the side ends of said main frame member for allowing folding of the attachment in non-use and mounted at their lower edges onto the side edges of the trunk in such a manner that their upper edges can abut on the side peripheral edges of said trunk cover, and elongate locking means mounted on said trunk cover and extending downwardly beyond said main frame member for cooperating with a usual locking catch device provided in the automobile trunk.

References Cited

UNITED STATES PATENTS

| | | | | |
|---|---|---|---|---|
| 2,793,070 | 5/1957 | Wernig | | 296—76 |
| 2,850,087 | 9/1958 | Janaman | | 160—105 |
| 3,107,649 | 10/1963 | Blend | | 119—17 |

BENJAMIN HERSH, *Primary Examiner.*

L. DANIEL MORRIS, JR., *Assistant Examiner.*

U.S. Cl. X.R.

296—24; 119—17; 224—42.42